US011812378B2

(12) United States Patent
Lin

(10) Patent No.: US 11,812,378 B2
(45) Date of Patent: *Nov. 7, 2023

(54) USER MANAGEMENT DEVICE, BNG, AND BNG USER INTERNET ACCESS METHOD AND SYSTEM

(71) Applicant: Huawei Technologies Co., Ltd., Shenzhen (CN)

(72) Inventor: Chengyong Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,327

(22) Filed: Jun. 10, 2022

(65) Prior Publication Data

US 2022/0385501 A1 Dec. 1, 2022

Related U.S. Application Data

(63) Continuation of application No. 17/033,058, filed on Sep. 25, 2020, now Pat. No. 11,375,446, which is a
(Continued)

(51) Int. Cl.
*H04W 48/18* (2009.01)
*H04W 48/16* (2009.01)
(Continued)

(52) U.S. Cl.
CPC ......... *H04W 48/18* (2013.01); *H04L 12/2801* (2013.01); *H04L 12/4641* (2013.01);
(Continued)

(58) Field of Classification Search
CPC ..... H04W 12/06; H04W 48/17; H04W 88/16; H04W 48/18; H04W 48/16; H04L 69/40
See application file for complete search history.

(56) References Cited

U.S. PATENT DOCUMENTS 6,966,004 B1   11/2005  Jin et al.
7,738,452 B1    6/2010  O'Rourke et al.
(Continued)

FOREIGN PATENT DOCUMENTS

CN    102223365 A    10/2011
CN    102882699 A     1/2013
(Continued)

*Primary Examiner* — Omer S Mian
(74) *Attorney, Agent, or Firm* — Slater Matsil, LLP

(57) ABSTRACT

The application discloses an Internet access method. The method includes receiving a first Internet access packet reported by a first BNG, the first Internet access packet carrying user information and information of the first BNG, and receiving the user's second Internet access packet reported by a second BNG, wherein the second Internet access packet carries user information and information of the second BNG. The method also includes recording, according to the user information, information of the first BNG and information of the second BNG in a BNG list to which the user belongs, and selecting, according to a preset policy, the first BNG from the BNG list. The method also includes delivering the user's forwarding information to the first BNG; and sending a response packet to the user, where the response packet is used to instruct the user to access the Internet by using the first BNG.

24 Claims, 5 Drawing Sheets

Related U.S. Application Data continuation of application No. 16/227,755, filed on Dec. 20, 2018, now Pat. No. 10,820,264, which is a continuation of application No. 15/009,954, filed on Jan. 29, 2016, now Pat. No. 10,187,849, which is a continuation of application No. PCT/CN2013/080468, filed on Jul. 31, 2013.

(51) Int. Cl.
| | | |
|---|---|---|
| *H04W 88/16* | (2009.01) | |
| *H04L 12/28* | (2006.01) | |
| *H04L 12/46* | (2006.01) | |
| *H04L 12/66* | (2006.01) | |
| *H04L 9/40* | (2022.01) | |
| *H04W 12/06* | (2021.01) | |

(52) U.S. Cl.
CPC .............. *H04L 12/66* (2013.01); *H04L 63/08* (2013.01); *H04W 12/06* (2013.01); *H04W 48/16* (2013.01); *H04W 88/16* (2013.01)

(56) References Cited

U.S. PATENT DOCUMENTS

| | | | |
|---|---|---|---|
| 10,187,849 B2* | 1/2019 | Lin | ................... H04W 48/18 |
| 10,820,264 B2* | 10/2020 | Lin | ................... H04W 88/16 |
| 11,375,446 B2* | 6/2022 | Lin | ................... H04W 48/18 |
| 2007/0263538 A1 | 11/2007 | Hueck et al. | |
| 2010/0131660 A1 | 5/2010 | Dec et al. | |
| 2010/0138538 A1* | 6/2010 | Zheng | ................ H04L 43/10 |
| | | | 709/228 |
| 2014/0143428 A1* | 5/2014 | Zheng | ............ H04L 65/1073 |
| | | | 709/226 |
| 2014/0280938 A1 | 9/2014 | Kadaba et al. | |
| 2015/0304246 A1* | 10/2015 | You | .................. H04L 49/201 |
| | | | 370/389 |

FOREIGN PATENT DOCUMENTS

| | | | |
|---|---|---|---|
| CN | 103139770 A | 6/2013 | |
| WO | 2012163178 A1 | 12/2012 | |
| WO | WO-2012163178 A1 * | 12/2012 | ............ H04L 61/15 |

\* cited by examiner

USER MANAGEMENT DEVICE, BNG, AND BNG USER INTERNET ACCESS METHOD AND SYSTEM

CROSS-REFERENCE TO RELATED APPLICATIONS

This application is a continuation of U.S. patent application Ser. No. 17/033,058, filed on Sep. 25, 2020, which is a continuation of U.S. patent application Ser. No. 16/227,755, filed on Dec. 20, 2018, now U.S. Pat. No. 10,820,264, which is a continuation of U.S. patent application Ser. No. 15/009,954, filed on Jan. 29, 2016, now U.S. Pat. No. 10,187,849, which is a continuation of International Application No. PCT/CN2013/080468, filed on Jul. 31, 2013. All of the aforementioned applications are hereby incorporated by reference in their entireties.

TECHNICAL FIELD

The application relates to the field of computer and communications technologies, and in particular, to a user management device, BNG, and BNG user Internet access method and system.

BACKGROUND

A broadband network gateway device (BNG) mainly implements two functions, including a network bearer function, which connects a user device to a BNG device to enable a user to access the Internet, and a control implementation function, which works with an authentication system, a charging system, a customer management system, and a service policy control system to implement authentication, charging, and management functions of user access.

A broadband access server is an access gateway oriented to a broadband network application. It is a bridge connecting a broadband access network to a backbone network and providing basic access means and a broadband access network management function. It is located on an edge of a network, provides a broadband access service, implements convergence and forwarding for multiple types of service, and can meet different users' requirements for a transmission capacity and bandwidth usage, and therefore is a core device for broadband user access.

FIG. 1 is an architecture diagram of BNG user Internet access in the prior art. When a user accesses the Internet by using a BNG, a PPPOE or an IPOE Internet access packet is sent to the BNG shown in FIG. 2. The BNG includes a user management module 210 and forwarding module 220. The forwarding module 220 includes a user table and a forwarding table, and is located on a forwarding plane of the BNG. The user management module 210 is located on a control plane of the BNG and configured to control the forwarding module 220. After receiving an Internet access packet, the BNG directly processes the packet. After the BNG performs authentication and authorization using an AAA server and determines that the user is an authorized user, a user management module of the BNG allocates a corresponding resource to the user, including an IP address and the like, and delivers a corresponding table (including a user table and forwarding table) to a data forwarding plane (forwarding chips such as an NP) of the BNG. After acquiring the IP address, the user can normally implement an Internet access behavior using the IP address.

When a user accesses the Internet by using the BNG, the user management module and a user table forwarding module are located on a same BNG. Therefore, a user can access the Internet by using only one BNG. After the BNG breaks down, the user cannot be automatically connected to the Internet by using another BNG. The number of users who access the Internet on each BNG is limited, and therefore capacity expansion is difficult. Though a two-node cluster hot backup technology can resolve a user Internet access disconnection problem, capacity expansion is difficult and a networking technology is complicated. Therefore, the following problems are found in the prior art.

1. A user capacity cannot be expanded flexibly. That is, a user capacity cannot be expanded according to a requirement without changing a networking architecture.

2. If an Internet access device breaks down, by using the active/active two-node cluster technology, a user can only be migrated to a specified device, but the user cannot be automatically migrated to other Internet access devices.

SUMMARY

Embodiments of the application provide a user management device, BNG, BNG user Internet access method and system so as to resolve a problem in the prior art that a user capacity cannot be expanded flexibly. That is, a user capacity cannot be expanded according to a requirement without changing a networking architecture.

To resolve the foregoing technical problem, the embodiments of the application disclose the following technical solutions.

According to a first aspect, a user Internet access method is provided and includes: receiving, by a user management device, a user's first Internet access packet reported by a first broadband network gateway device BNG, where the first Internet access packet carries user information of the user and information of the first BNG. The method also includes receiving, by the user management device, the user's second Internet access packet reported by a second broadband network gateway device BNG, where the second Internet access packet carries user information of the user and information of the second BNG, and recording, by the user management device according to the user information, information of the first BNG and information of the second BNG in a BNG list to which the user belongs. The method also includes selecting, by the user management device according to a preset policy, the first BNG from the BNG list, delivering, by the user management device, the user's forwarding information to the first BNG; and sending, by the user management device, a response packet to the user, where the response packet is used to instruct the user to access the Internet by using the first BNG.

In a first possible implementation manner of the first aspect, the preset policy includes selecting a BNG with least load or selecting a BNG with a shortest delay.

In a second possible implementation manner of the first aspect, before the recording, by the user management device according to the user information, the information of the first BNG and the information of the second BNG in the BNG list to which the user belongs, the method further includes: validating, by the user management device, that the user is an authorized user.

In a third possible implementation manner of the first aspect, the method further includes: after the user management device learns that a link of the first BNG breaks down, delivering forwarding information of the user on the link to the second BNG whose link does not break down.

In a fourth possible implementation manner of the first aspect, the method further includes: after the user management device learns that the first BNG breaks down, delivering forwarding information of the user on the first BNG to the second BNG whose link does not break down.

According to a second aspect, a user Internet access method is provided and includes: receiving, by a broadband network gateway device BNG, an Internet access packet uploaded by a user and reporting the Internet access packet to a user management device, where the Internet access packet carries user information of the user and information of the BNG; and receiving and saving, by the BNG, the user's forwarding information delivered by the user management device.

According to a third aspect, a user management device is provided and includes: an Internet access packet receiving module, configured to receive, a user's first Internet access packet reported by a first broadband network gateway device BNG, where the first Internet access packet carries user information of the user and information of the first BNG, and to further receive, the user's second Internet access packet reported by a second broadband network gateway device BNG, where the second Internet access packet carries user information of the user and information of the second BNG. The device also includes an Internet access information recording module, configured to record, according to the user information, information of the first BNG and information of the second BNG in a BNG list to which the user belongs, and a BNG selection module, configured to select, according to a preset policy, the first BNG. The device also includes an Internet access information delivery module, configured to deliver the user's forwarding information to the first BNG; and an Internet access notification module, configured to send a response packet to the user, where the response packet is used to instruct the user to access the Internet by using the first BNG.

In a first possible implementation manner of the third aspect, the preset policy includes selecting a BNG with least load or selecting a BNG with a shortest delay.

In a second possible implementation manner of the third aspect, the user management device further includes: a user validation module, configured to validate that the user is an authorized user before recording, according to the user information, the information of the first BNG and the information of the second BNG in the BNG list to which the user belongs.

In a third possible implementation manner of the third aspect, the user management device further includes: a reconnection-upon-offline module, configured to deliver forwarding information of the user on a link of the first BNG to the second BNG whose link does not break down after the link of the first BNG breaks down.

In a fourth possible implementation manner of the third aspect, the user management device further includes: a reconnection-upon-offline module, configured to deliver the forwarding information of the user on the first BNG to the second BNG whose link does not break down after the first BNG breaks down.

According to a fourth aspect, a broadband network gateway device BNG is provided and includes: an Internet access packet reporting module, configured to receive an Internet access packet uploaded by a user and report the Internet access packet to a user management device, where the Internet access packet carries user information of the user and information of the BNG; and an Internet access information updating module, configured to receive and save the user's forwarding information delivered by the user management device.

According to a fifth aspect, a user Internet access system is provided and includes a user management device and a broadband network gateway device BNG, where: the BNG receives an Internet access packet reported by a user and reports the Internet access packet to the user management device, where the Internet access packet carries user information of the user and information of the BNG; the user management device records, according to the user information, information of the BNG in a BNG list to which the user belongs, selects, according to a preset policy, a BNG from the list of BNGs that report the user's Internet access packets, delivers the user's forwarding information to the selected BNG, and sends a response packet to the user, where the response packet is used to instruct the user to access the Internet by using the selected BNG; and the selected BNG receives and saves the user's forwarding information delivered by the user management device.

In the embodiment of the application, an independent user management device manages BNG user Internet access so as to conveniently increase the number of BNGs connected to the user management device and ensure that a user capacity can be flexibly expanded without affecting experience of online users.

BRIEF DESCRIPTION OF THE DRAWINGS

To describe the technical solutions in the embodiments of the application more clearly, the following briefly introduces the accompanying drawings required for describing the embodiments. Apparently, the accompanying drawings in the following description show some embodiments of the application, and a person of ordinary skill in the art may further derive other drawings from these accompanying drawings without creative efforts.

DETAILED DESCRIPTION OF ILLUSTRATIVE EMBODIMENTS

To make the objectives, technical solutions, and advantages of the embodiments of the application clearer, the following describes the technical solutions in the embodiments of the application with reference to the accompanying drawings in the embodiments of the application. Apparently, the described embodiments are a part rather than all of the embodiments of the application. All other embodiments obtained by a person of ordinary skill in the art based on the embodiments of the application without creative efforts shall fall within the protection scope of the application.

The specific implementation manners of the application are further described in detail with reference to accompanying drawings and embodiments as follows, where the following embodiments are used to describe but not limit the application:

In a first embodiment of the application, a user Internet access method is provided. In the method, a user management device independent of a BNG is used to manage BNG user Internet access. In the method in the embodiment, a networking architecture shown in FIG. 2 can be used, according to which a user 310 connects to a BNG 330 through an L2 switching network 320, the BNG 330 connects to a user management device 350 to enable the user 310 to access the Internet 360, and the user management device 350 further connects to an AAA server 340 to authenticate the user.

Figure 4:
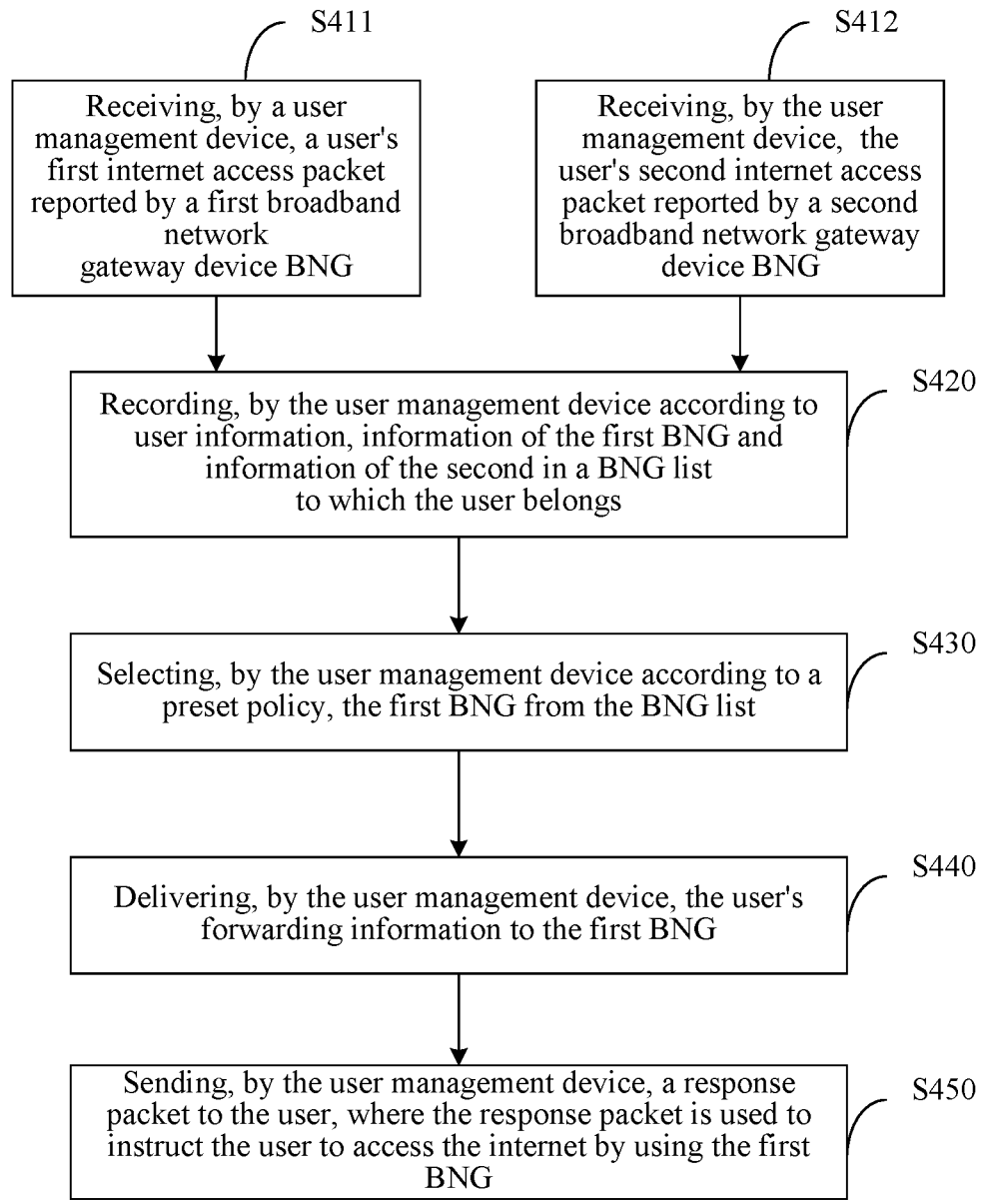
FIG. 4 is a flowchart of a BNG user Internet access method according to an embodiment of the application.

FIG. 4 is a flowchart of the foregoing method, where the method includes the following steps.

S411: The user management device receives a user's first Internet access packet reported by a first broadband network gateway device BNG, where the first Internet access packet carries user information of the user and information of the first BNG. For example, the information of the first BNG usually includes a MAC address, an ID, and other information of the BNG.

S412: The user management device receives the user's second Internet access packet reported by a second broadband network gateway device BNG, where the second Internet access packet carries the user information of the user and information of the second BNG. For example, the information of the second BNG usually includes a MAC address, an ID, and other information of the BNG.

In this embodiment, an Internet access packet of the user is a standard IPOE/PPPOE Internet access packet that carries the user information of the user and the information of the BNGs that report the Internet access packet. The user information includes the MAC (Media Access Control) address, VLAN (Virtual Local Area Network) information, a session ID (SESSION ID), and the like. The Internet access packet of the user is broadcast through an L2 switching network to all BNGs connected to the L2 switching network (different users may be connected to different L2 switching networks and therefore Internet access packets of different users may be reported by different BNGs). That is, all the BNGs connected to the L2 switching network report Internet access packets of all users connected to the L2 switching network to the user management device.

S420: The user management device records, according to the user information, the information of the first BNG and the information of the second BNG in a BNG list to which the user belongs. The BNG list to which the user belongs is maintained in the user management device and records information of BNGs by using which the user can access the Internet. These BNGs are the BNGs that report Internet access packets of the user.

S430: The user management device selects, according to a preset policy, the first BNG from the BNG list. The preset policy may specify that, the user management device monitors load of every BNG and selects a BNG with relatively less load from the BNG list, where a BNG that has least load is selected with top priority, or monitors a delay of every BNG and selects a BNG with a relatively shorter delay, where the BNG with a shortest delay is selected with top priority.

S440: The user management device delivers the user's forwarding information to the first BNG, so that the user accesses the Internet by using the first BNG. The forwarding information includes a list of BNGs that report the user's Internet access packets, which includes the information of the first BNG and the information of the second BNG. The user management device further sends a response packet to the user by using the first BNG, where the response packet is used to instruct the user to access the Internet by using the first BNG. Based on MAC address learning (MAC address learning is defined in IEEE802.1), the L2 switching network connected to the first BNG is notified that the user's data flow can access the Internet by using the BNG.

Further, to ensure network security, before the user management device records, according to the user information, the information of the first BNG and the information of the second BNG in the BNG list to which the user belongs, the user management device further includes: checking whether the user is an authorized user, and performing a subsequent operation if the user is an authorized user, or discarding the Internet access packet of the user if the user is not an authorized user.

In the method in the embodiment, an independent user management device exchanges user information and forwarding information with a BNG to specify a BNG by using which a user can access the Internet and to manage BNG user Internet access in a unified manner, so as to conveniently increase the number of BNGs connected to the user management device and ensure that a user capacity can be flexibly expanded without affecting experience of an online user.

Further, after the user management device is notified (reported by a BNG or obtained based on BNG monitoring by the user management device) that a link of the first BNG breaks down, the user management device delivers forwarding information of all offline users on the link to the second BNG whose link does not break down, so that the users access the Internet through the link that does not break down. Different users are connected to different BNGs. That is, different users have different BNG lists. The user management device can deliver forwarding information of an offline user only to a BNG whose link does not break down in the offline user's BNG list. Therefore, the user management device forwards the offline user's forwarding information to the second BNG in the BNG list in which the first BNG is recorded. For an L2 switching network, because a link breaks down, the user management device immediately deletes a corresponding MAC address table and re-implements MAC address learning to direct a user data flow to another link.

Further, after the user management device is notified that the first BNG breaks down, the user management device delivers user information and forwarding information of all offline users connected to the first BNG that has broken down to the second BNG whose link does not break down, so that the offline users access the Internet by using the second BNG. Different users are connected to different BNGs. That is, different users have different BNG lists. The user management device delivers the user information and forwarding information of an offline user only to a BNG whose link does not break down in the offline user's BNG list. Therefore, the user management device delivers forwarding information of the offline user to the second BNG in the BNG list where the first BNG is recorded. For the L2 switching network, because a link of a BNG breaks down, the user management device immediately deletes the corresponding MAC address table and re-implements MAC address learning to direct the user data flow to another BNG.

In the foregoing process in which the user information and forwarding information of all offline users are delivered to another link or BNG that does not break down, the user management device can consider load of links that are not down and selects a link and BNG that has less load or a shorter delay with top priority.

Because the user management device is independent of a BNG and records information of a BNG by using which each user can access the Internet, after a link or BNG breaks down, the user management device can reallocate a user corresponding to the link or BNG to a link or BNG that does not break down, so as to ensure reliable Internet access.

Figure 5:
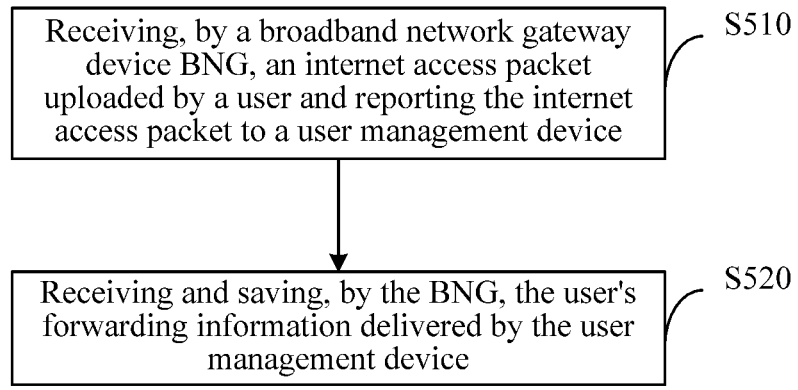
FIG. 5 is a flowchart of another BNG user Internet access method according to an embodiment of the application.

In a second embodiment of the application, a user Internet access method is provided. Refer to a networking architecture in FIG. 2. FIG. 5 shows a specific process of the foregoing method, where the method includes the following steps.

S510: A broadband network gateway device BNG receives an Internet access packet uploaded by a user and reports the Internet access packet to a user management device. The Internet access packet of the user is a standard IPOE/PPPOE Internet access packet that carries user information of the user and information of the BNG. The user's Internet access packet is broadcast to all BNGs through an L2 switching network. That is, each BNG can receive Internet access packets of all users connected to an L2 switching network to which the BNG is also connected. After receiving the Internet access packets, the BNGs report the Internet access packets to the user management device.

S520: The BNG receives and saves the user's forwarding information delivered by the user management device (during initial Internet access or Internet reconnection by the user). The forwarding information includes the user's BNG information reported. The BNG updates its user table and forwarding table and notifies the user that the user can access the Internet by using the BNG. That is, the BNG forwards to the user a response packet that is sent by the user management device and corresponds to the Internet access packet, so that the user accesses the Internet by using the BNG.

In the method in this embodiment, a BNG completes exchange of user information and forwarding information with an independent user management device and receives user information and forwarding information delivered by the user management device to enable the user to access the Internet by using the BNG and manage BNG user Internet access in a unified manner, so as to conveniently increase the number of BNGs connected to the user management device and ensure that a user capacity can be flexibly expanded without affecting experience of an online user.

Figure 6:
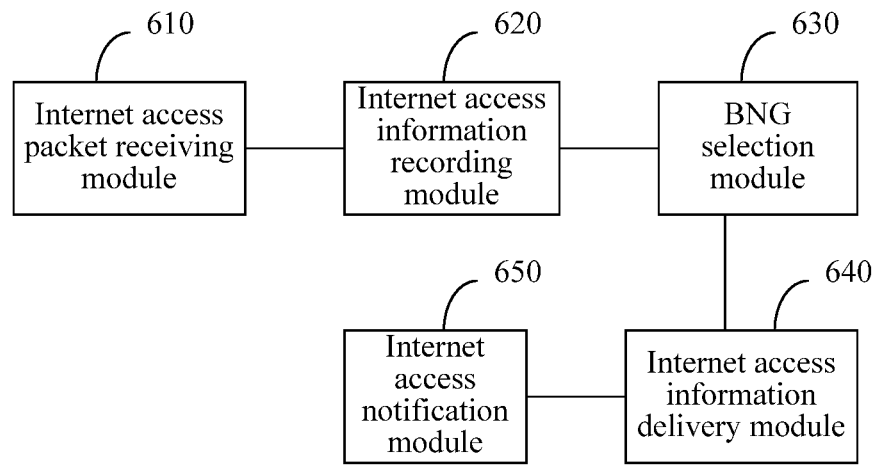
FIG. 6 is a schematic structural diagram of a user management device according to an embodiment of the application.

In a third embodiment of the application, a user management device is provided, as shown in FIG. 6. The device includes the following modules.

An Internet access packet receiving module 610 is configured to receive a user's first Internet access packet reported by a first broadband network gateway device BNG, where the first Internet access packet carries user information of the user and information of the first BNG, with the information of the first BNG usually including, for example, a MAC address, an ID, and other information of the first BNG, and receive the user's second Internet access packet reported by a second broadband network gateway device BNG, where the second Internet access packet carries the user information of the user and information of the second BNG, with the information of the second BNG usually including, for example, a MAC address, an ID, and other information of the second BNG. In this embodiment, an Internet access packet of the user is a standard IPOE/PPPOE Internet access packet that carries user information of the user and information of the BNGs that report the Internet access packet. The user information includes a MAC (Media Access Control) address, VLAN (Virtual Local Area Network) information, a session ID (SESSION ID), and the like. Internet access packets of users connected to an L2 switching network are broadcast to all BNGs connected to that L2 switching network (different users may be connected to different L2 switching networks and therefore Internet access packets of different users may be reported by different BNGs). That is, all BNGs connected to the L2 switching network report Internet access packets of all users connected to the L2 switching network to the user management device.

An Internet access information recording module 620 is configured to record, according to the user information, the information of the first BNG and the information of the second BNG in a BNG list to which the user belongs. The Internet access information recording module 620 maintains the BNG list to which the user belongs and records information of BNGs by using which each user can access the Internet. These BNGs are the BNGs that report Internet access packets of users.

A BNG selection module 630 is configured to select, according to a preset policy, the first BNG from a BNG list. The preset policy may specify that, the user management device monitors load of every BNG and selects a BNG with relatively less load from the BNG list, where a BNG with least load is selected with top priority, or monitors a delay of every BNG and selects a BNG with a shorter delay, where a BNG with a shortest delay is selected with top priority.

An Internet access information delivery module 640 is configured to deliver the user's forwarding information to the first BNG to enable the user to access the Internet by using the first BNG. The forwarding information includes a list of BNGs that report the user's Internet access packets, which includes the information of the first BNG and the information of the second BNG. A response packet is sent to the user by using a selected BNG. Based on MAC address learning, an L2 switching network connected to the selected BNG is notified that a user data flow can access the Internet by using the BNG.

Further, to ensure network security, the user management device further includes: a user validation module, configured to, before the user management device records, according to the user information, the information of the first BNG and the information of the second BNG in the BNG list to which the user belongs, check whether the user is an authorized user and perform a subsequent operation if the user is an authorized user or discard the Internet access packet of the user if the user is not an authorized user.

In this embodiment, the user management device exchanges user information and forwarding information with a BNG to specify a BNG by using which a user can access the Internet and to manage BNG user Internet access in a unified manner, so as to conveniently increase the number of BNGs connected to the user management device and ensure that the user capacity can be flexibly expanded without affecting the experience of an online user.

Further, the user management device further includes: a reconnection-upon-offline module, configured to, after a link of the first BNG breaks down, deliver forwarding information of all offline users on the link to the second BNG whose link does not break down, so that the offline users access the Internet by using the link of the second BNG.

The reconnection-upon-offline module is further used, after the first BNG breaks down, to deliver forwarding information of all offline users connected to the first BNG to the second BNG whose link does not break down, so that the offline users access the Internet by using the second BNG whose link does not break down.

Different users are connected to different BNGs. That is, different users have different BNG lists. The user management device delivers the user information and forwarding information of an offline user only to a BNG whose link does not break down in the offline user's BNG list. Therefore, the user management device forwards the offline user's forwarding information to the second BNG in the BNG list where the first BNG is recorded.

For an L2 switching network, because a link or a BNG breaks down, the user management device immediately deletes a corresponding MAC address table and re-implements MAC address learning to direct the user data flow to another link.

In the foregoing process in which user information and forwarding information of all offline users are delivered to another link or BNG that does not break down, the user management device can consider load of the links that are not down and selects a link and BNG with less load or a shorter delay with top priority.

Because the user management device is independent of a BNG and records information of a BNG by using which each user can access the Internet, after a link or BNG breaks down, the user management device can reallocate a user corresponding to the link or BNG to a link or BNG that does not break down, so as to ensure reliable Internet access.

Figure 7:
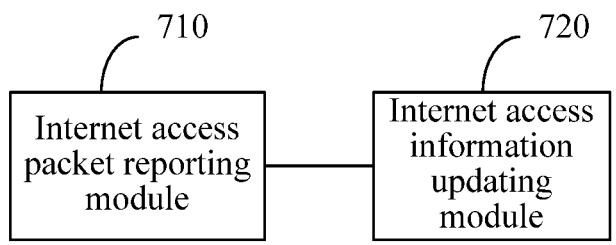
FIG. 7 is a schematic structural diagram of a BNG according to an embodiment of the application.

In a fourth embodiment of the application, a broadband network gateway device BNG is provided, as shown in FIG. 7, and includes the following.

An Internet access packet reporting module 710 is configured to receive an Internet access packet uploaded by a user and report the Internet access packet to a user management device. The Internet access packet of the user is a standard IPOE/PPPOE Internet access packet that carries user information of the user and information of the BNG. The user's Internet access packet is broadcast to all BNGs through an L2 switching network. That is, each BNG can receive Internet access packets of all users connected to an L2 switching network to which the BNG is also connected. After receiving the Internet access packets, the BNGs report the Internet access packets to the user management device.

An Internet access information updating module 720 is configured to receive and save a user's forwarding information delivered by the user management device (during initial Internet access or Internet reconnection by the user). The forwarding information includes the user's BNG information reported. The BNG updates its user table and forwarding table and notifies the user that the user can access the Internet by using the BNG. That is, the BNG forwards to the user a response packet that is sent by the user management device and corresponds to the Internet access packet, so that the user accesses the Internet by using the BNG.

In this embodiment, a BNG completes exchange of user information and forwarding information with an independent user management device and receives user information and forwarding information of a user delivered by the user management device to enable the user to access the Internet by using the BNG and manage BNG user Internet access in a unified manner, so as to conveniently increase the number of BNGs connected to the user management device and ensure that a user capacity can be flexibly expanded without affecting experience of an online user.

Figure 1:
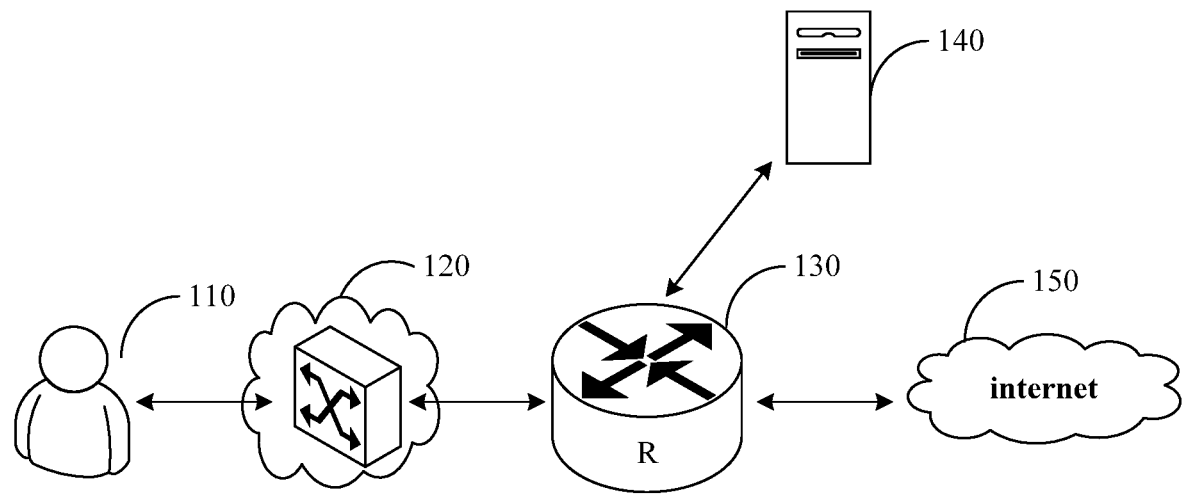
FIG. 1 is a schematic architecture diagram of a BNG user Internet access method in the prior art.
Figure 2:
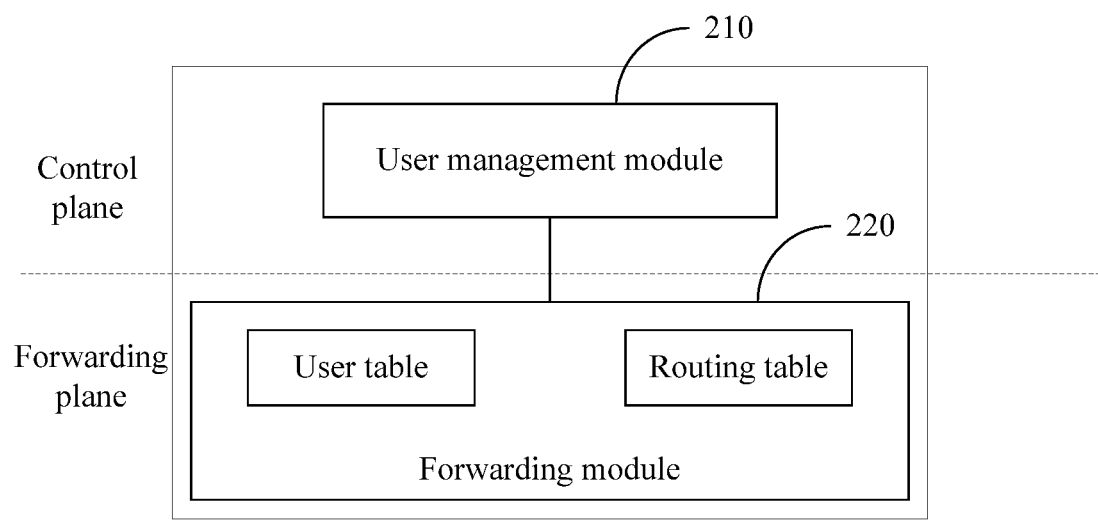
FIG. 2 is a schematic structural diagram of a BNG in the prior art.
Figure 3:
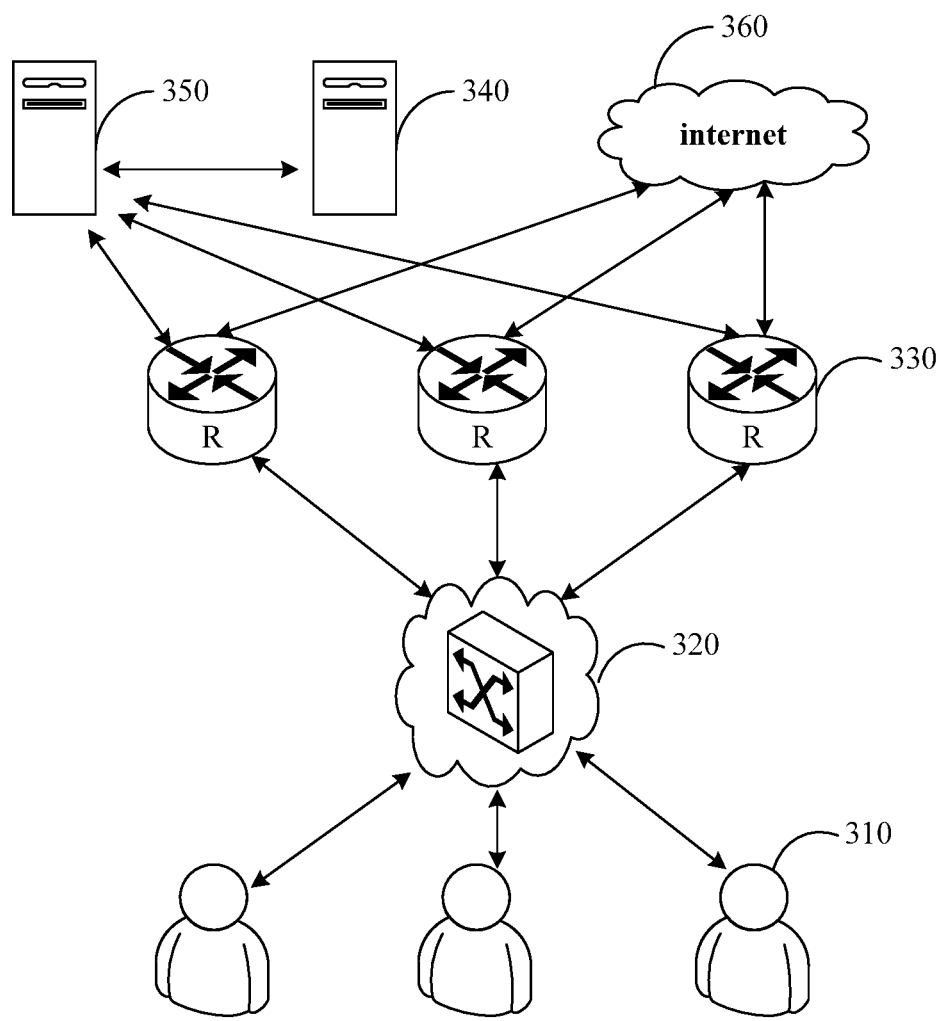
FIG. 3 is a schematic architecture diagram of a BNG user Internet access method according to the application.

In a fifth embodiment of the application, a user Internet access system is provided, where the system includes: any one of the user management devices mentioned above and the foregoing broadband network gateway device BNG. As shown in FIG. 2, a user management device 350 is connected to multiple BNGs 330. The system further includes an L2 switching network 320 and an AAA server 340.

A user's Internet access packet is broadcast through the L2 switching network to all BNGs 330, which forward the Internet access packet to the user management device 350.

The user management device 350 interacts with the AAA server 340. After the user is authenticated, the user management device 350 records information about the user, such as a MAC/VLAN/SESSIONID and other information of the user, assigns an ID and IP address to the user, and so on. The user management device 350 identifies, based on Internet access packets reported by the BNGs 330, the BNGs 330 by using which a user 310 can access the Internet.

Based on a selection policy, the user management device 350 selects a BNG 330 for Internet access, such as a BNG 330 with less load.

The user management device 350 delivers forwarding tables, including a user table (carrying user information) and a forwarding table (carrying forwarding information), to the selected BNG 330 and sends a response packet to the user 310 by using the BNG 330. Based on MAC address learning, the L2 switching network 320 connected to the selected BNG 330 is notified that a user data flow can access the Internet 360 by using the BNG 330.

After the user management device 350 learns that a link of the selected BNG 330 breaks down, the user management device immediately reallocates all users 310 on the link, based on the selection policy, to other links or BNGs 330 by delivering corresponding user tables and forwarding tables to the BNGs 330. For the L2 switching network 320, because the link breaks down, the user management device immediately deletes a corresponding MAC address table and re-implements MAC address learning to direct the user data flow to another link or BNG 330.

After the user management device 350 learns that the selected BNG 330 breaks down, the user management device immediately reallocates all users from the BNG 330, based on the selection policy, to other BNGs 330 by delivering corresponding user tables and forwarding tables the users to the other BNGs 330. For the L2 switching network 320, because the link between the selected BNG 330 and the L2 switching network 320 breaks down, the user management device immediately deletes the corresponding MAC address table and re-implements MAC address learning to direct the user data flow to another BNG 330.

Figure 8:
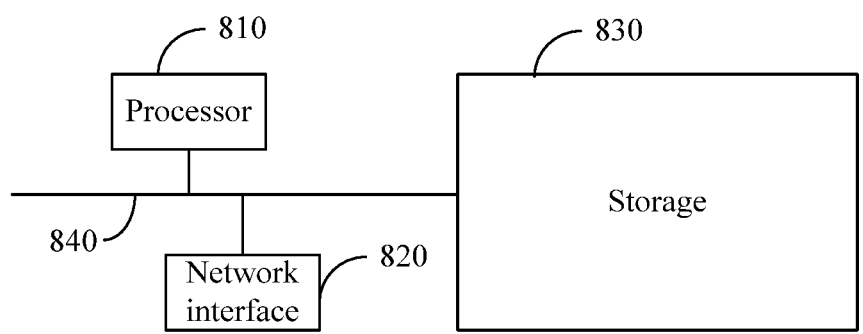
FIG. 8 is a schematic structural diagram of hardware of a user management device according to the application.

In another embodiment of the application, the user management device in the foregoing embodiment can be a user management device shown in FIG. 8 which includes at least one processor 810 (such as a CPU), at least one network interface 820 or another communications interface, a storage 830, and at least one communications bus 840 that achieves connection and communication between these apparatuses. The processor 810 is used to execute an executable module, such as a computer program, in the storage 830. The storage 830 may include a high-speed random access memory (Random Access Memory, RAM), or may also include a non-volatile memory (non-volatile memory), for example, at least one disk storage. Through the at least one network interface 820 (wired or wireless), a system gateway communicates with at least one another network element on the Internet, a wide area network, a local area network, a metropolitan area network, and the like.

In some implementation manners, the storage 830 stores a program which can be executed by the processor 810. This program includes the following.

The user management device receives a user's Internet access packet reported by each BNG; the user management device records user information and forwarding information of the user according to the Internet access packet, where the forwarding information includes a list of BNGs that report the user's Internet access packets; the user management device selects a BNG from the list of BNGs that report the user's Internet access packets; the user management device delivers the user information and forwarding information to the selected BNG, so that the user can access the Internet by using the BNG.

A person of ordinary skill in the art may understand that all the aspects or possible implementation manners of the aspects of the application may be implemented as a system, method, or computer program product. Accordingly, all the aspects or possible implementation manners of the aspects of the application may be an entirely hardware embodiment, an entirely software embodiment (including firmware, resident software, and the like) or a combination of software and hardware in the form of an embodiment, all of which are generally referred to herein as "circuit", "module" or "system". Furthermore, all the aspects or possible implementation manners of the aspects of the application can be used in the form of a computer program product, which is computer readable program code that is carried in a computer-readable medium.

A computer-readable medium may be a computer readable signal medium or a computer-readable storage medium. The computer-readable storage medium may be, but is not limited to, an electronic, magnetic, optical, electromagnetic, infrared, or semiconductor system, apparatus or device, or any suitable combination of these, such as a random access memory (RAM), read only memory (ROM), erasable programmable read-only memory (EPROM or flash), optical fiber, or portable compact disc read-only memory (CD-ROM).

A processor of a computer reads the computer-readable program code stored in a computer-readable medium to enable the processor to perform functional actions specified in every step or a combination of steps in a flowchart, or to create apparatuses that perform the functional actions specified in every block or a combination of blocks in a block diagram.

Computer-readable program code can be executed completely on a user's computer, partially on a user's computer, as an independent software package, partially on a user's computer and partially on a remote computer, or completely on a remote computer or server. It must be noted that in some substitute embodiments, the functions described in the steps in a flowchart or blocks in a block diagram may not be implemented in an order specified in the flowchart or block diagram. For example, two continuous steps or blocks may be executed almost at the same time or in a reverse order depending on the function involved.

Apparently, those skilled in the art may change or vary the application without departing from the true intention of the application. Thus, if these changes and variations of the application are within the claims of the invention and scope of technical equivalents, the application is also intended to include these changes and variations.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A device, comprising:
a processor; and
a non-transitory computer-readable storage medium storing a program to be executed by the processor, wherein when the program is executed the program causes the device to:
receive a plurality of Internet access packets of a user from a plurality of broadband network gateway devices (BNGs), wherein each Internet access packet of the plurality of Internet access packets carries user information of the user, the plurality of Internet access packets are received by the device after an access packet is broadcasted from the user to the plurality of BNGs, each BNG of the plurality of BNG forwards the access packet to the device, and each of the plurality of Internet access packets corresponds to the access packet that is broadcasted from the user to the plurality of BNGs;
validate that the user is an authorized user and assign an internet protocol (IP) address to the user;
select, according to a preset policy, a first BNG from the plurality of BNGs for the user; and
deliver forwarding information of the user to the first BNG for the first BNG to use to perform forwarding of the user's data.

2. The device according to claim 1, wherein when the program is executed the program further causes the device to:
select, after a link of the first BNG breaks down, a second BNG from the plurality of BNGs, wherein the the link of the first BNG that breaks down does not correspond to the second BNG; and
deliver the forwarding information of the user to the second BNG.

3. The device according to claim 1, wherein when the program is executed the program causes the device to:
select, after the first BNG breaks down, a second BNG, wherein the second BNG is operational; and
deliver the forwarding information of the user to the second BNG.

4. The device according to claim 1, wherein the user information includes a media access control (MAC) address or virtual local area network (VLAN) information.

5. The device according to claim 1, wherein each Internet access packet of the plurality of Internet access packets further carries information of a corresponding BNG of the plurality of BNGs that forwards the respective Internet access packet to the device; and
wherein when the program is executed the program further causes the device to:
in response to receiving the plurality of Internet access packets of the user from the plurality of BNGs, record, according to the user information carried in the plurality of Internet access packets, the information of each corresponding BNG of the plurality of BNGs that sends an Internet access packet of the plurality of Internet access packets, to form a BNG list of BNGs to which the user belongs.

6. The device according to claim 1, wherein when the program is executed the program further causes the device to:
send a response packet to the user, wherein the response packet instructs the user to access the Internet using the first BNG.

7. A broadband network gateway (BNG), comprising:
a processor;
a non-transitory computer-readable storage medium storing a program to be executed by the processor, wherein when the program is executed the program causes the BNG to:
receive an Internet access packet from a user, wherein the Internet access packet is broadcasted by the user to each BNG of a plurality of BNGs which are connected to the user by a switching network, and the BNG is comprised in the plurality of BNGs;
forward the Internet access packet to a user management device, wherein the forwarded Internet access packet carries user information of the user, and wherein each of the plurality of BNGs that receives the Internet access packet forwards the Internet access packet to the user management device;
receive and save forwarding information of the user delivered by the user management device after the user management device validates that the user is an authorized user, assigns an internet protocol (IP) address to the user, and selects the BNG from the plurality of BNGs according to a preset policy; and
forward the user's data based on the forwarding information of the user.

8. The BNG according to claim 7, wherein the user information of the user includes a media access control (MAC) address or virtual local area network (VLAN) information.

9. A system, comprising:
a user management device; and
a plurality of broadband network gateway devices (BNGs) connected to a user by a switching network;
wherein each BNG of the plurality of BNGs is configured to:
receive an Internet access packet, wherein the internet access packet is broadcasted by the user to the plurality of BNGs; and
forward the Internet access packet to the user management device, wherein the forwarded Internet access packet carries user information of the user; and
wherein the user management device is configured to:
validate that the user is an authorized user and assign an internet protocol (IP) address to the user;
select, according to a preset policy, a first BNG from the plurality of BNGs; and
deliver forwarding information of the user to the first BNG for the first BNG to use to perform forwarding of the user's data.

10. The system according to claim 9, wherein the user management device is further configured to:
select, after a link of the first BNG breaks down, a second BNG from the plurality of BNGs, wherein the the link of the first BNG that breaks down does not correspond to the second BNG; and
deliver the forwarding information of the user to the second BNG.

11. The system according to claim 9, wherein the user management device is further configured to:
select, after the first BNG breaks down, a second BNG, wherein the second BNG is operational; and
deliver the forwarding information of the user to the second BNG.

12. The system according to claim 9, wherein the user information includes a media access control (MAC) address or virtual local area network (VLAN) information.

13. The system according to claim 9, wherein each Internet access packet received from each BNG further carries information of a corresponding BNG of the plurality of BNGs that forwards the respective Internet access packet to the user management device; and
wherein the user management device is further configured to:
in response to receiving the Internet access packet of the user from each of the plurality of BNGs, record, according to the user information carried in the received Internet access packets, the information of each corresponding BNG of the plurality of BNGs that sends an Internet access packet, to form a BNG list of BNGs to which the user belongs.

14. The system according to claim 9, wherein the user management device is further configured to:
send a response packet to the user, wherein the response packet instructs the user to access the Internet using the first BNG.

15. A method implemented in a user management device, the method comprising:
receiving a plurality of Internet access packets of a user from a plurality of broadband network gateway devices (BNGs), wherein each Internet access packet of the plurality of Internet access packets carries user information of the user, the plurality of Internet access packets are received by the user management device after an access packet is broadcasted from the user to the plurality of BNGs, each BNG of the plurality of BNG forwards the access packet to the device, and each of the plurality of Internet access packets corresponds to the access packet that is broadcasted from the user to the plurality of BNGs;
validating that the user is an authorized user and assigning an internet protocol (IP) address to the user;
selecting, according to a preset policy, a first BNG from the plurality of BNGs; and
delivering forwarding information of the user to the first BNG for the first BNG to use to perform forwarding of the user's data.

16. The method according to claim 15, further comprising:
selecting, after a link of the first BNG breaks down, a second BNG from the plurality of BNGs, wherein the the link of the first BNG that breaks down does not correspond to the second BNG; and
delivering the forwarding information of the user to the second BNG.

17. The method according to claim 15, further comprising:
selecting, after the first BNG breaks down, a second BNG, wherein the second BNG is operational; and
delivering the forwarding information of the user to the second BNG.

18. The method according to claim 15, wherein the preset policy instructs to select a BNG of the plurality of BNGs with a smallest load, or to select a BNG of the plurality of BNGs with a shortest delay.

19. The method according to claim 15, wherein the user information includes a media access control (MAC) address or virtual local area network (VLAN) information.

20. The method according to claim 15, wherein each Internet access packet of the plurality of Internet access packets further carries information of a corresponding BNG of the plurality of BNGs that forwards the respective Internet access packet to the device; and wherein the method further comprises:

in response to receiving the plurality of Internet access packets of the user from the plurality of BNGs, recording, according to the user information carried in the plurality of Internet access packets, the information of each corresponding BNG of the plurality of BNGs that sends an Internet access packet of the plurality of Internet access packets, to form a BNG list of BNGs to which the user belongs.

21. The method according to claim 15, further comprising:
sending a response packet to the user, wherein the response packet instructs the user to access the Internet using the first BNG.

22. The device according to claim 1, wherein the preset policy instructs to select a BNG of the plurality of BNGs with a shortest BNG delay.

23. The BNG according to claim 7, wherein when the program is executed the program causes the BNG to:
add an identifier of the BNG to the Internet access packet, to obtain a modified Internet access packet, wherein the modified Internet access packet carries the identifier of the BNG and user information of the user; and
wherein forwarding the Internet access packet to a user management device comprises:
forwarding the modified Internet access packet to a user management device.

24. The method according to claim 15, wherein each Internet access packet of the plurality of Internet access packets further carries an identifier of a corresponding BNG of the plurality of BNGs that forwards the respective Internet access packet to the device.

\* \* \* \* \*